United States Patent
Vishwakarma et al.

(10) Patent No.: US 11,546,217 B1
(45) Date of Patent: Jan. 3, 2023

(54) DETECTING CONFIGURATION ANOMALY IN USER CONFIGURATION

(71) Applicant: Hewlett Packard Enterprise Development LP, Houston, TX (US)

(72) Inventors: Vinay Kumar Vishwakarma, Bengaluru (IN); Dinesh Pulivalam Ramakrishnan, Bengaluru (IN); Vinitha Harimoorthy, Bengaluru (IN); Elango Kumarasamy, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/475,289

(22) Filed: Sep. 14, 2021

(51) Int. Cl.
*G06F 15/173* (2006.01)
*H04L 41/0866* (2022.01)

(52) U.S. Cl.
CPC .............................. *H04L 41/0866* (2013.01)

(58) Field of Classification Search
CPC .................................................. H04L 41/0866
See application file for complete search history.

(56) References Cited

U.S. PATENT DOCUMENTS

| | | | | |
|---|---|---|---|---|
| 8,918,359 | B2 * | 12/2014 | Ahuja | H04L 63/20 707/607 |
| 10,608,879 | B2 * | 3/2020 | Sawai | H04L 41/0843 |
| 2018/0121544 | A1 * | 5/2018 | Cho | G06F 16/951 |
| 2019/0141061 | A1 * | 5/2019 | Krishtal | H04L 63/101 |

FOREIGN PATENT DOCUMENTS

| | | | | | |
|---|---|---|---|---|---|
| CN | 103257913 | A | * | 8/2013 | |
| CN | 105912380 | A | * | 8/2016 | ............... G06F 8/42 |
| CN | 106845246 | A | * | 6/2017 | ......... G06F 16/3329 |
| CN | 107180064 | A | * | 9/2017 | |
| CN | 112398809 | A | * | 2/2021 | |
| CN | 112767933 | A | * | 5/2021 | |
| CN | 114357972 | A | * | 4/2022 | |

* cited by examiner

*Primary Examiner* — Richard G Keehn
(74) *Attorney, Agent, or Firm* — Park, Vaughan, Fleming & Dowler LLP

(57) ABSTRACT

One aspect of the instant application facilitates detection of configuration anomaly. During operation, a system can convert a set of rules associated with configuration syntax information for a feature in a respective feature document to at least a structured regular expression. Then the system generates a set of configuration templates with a respective configuration template including the structured regular expression corresponding to the feature document. The system can select, based on a target configuration associated with the network device, a subset of the configuration templates and can extract, based on a match between the selected configuration templates and the target configuration, a set of features. The system can determine one or more rules associated with the extracted features. Based on the one or more rules the system can determine an anomaly in the target configuration and generate at least one recommended configuration to alleviate the anomaly.

20 Claims, 8 Drawing Sheets

```
EXAMPLE SYNTAX IN FEATURE GUIDE port-access device-profile <*DP_NAME*>
    "enable"
    associate role <ROLE_NAME>
    {associate lldp-group <<LLDP_GROUP_NAME>> |
     associate cdp-group <<CDP_GROUP_NAME>> |
     associate mac-group <<MAC_GROUP_NAME>>}

{
port-access lldp-group <*LLDP_GROUP_NAME*>
    [ [no] [ seq <LLDP_SEQ_ID> ] {match | ignore} <LLDP_MATCH_RULE...> ]
```

```
EXAMPLE PROCESSED DATA IN CONFIGURATION TEMPLATE

"syntax": {
 "device_profile": {
   "feature_name": "device_profile",
   "feature_optional": false,
   "feature_syntax": [
     {
       "syntax_string": "port-access device-profile <DP_NAME>",
       "regex": "^port-access\\s*device-profile\\s*\\s*(?P<DP_NAME>\\s+)\\s*$",
       "platform": "common",
       "children": [
         {
           "syntax_string": "enable",
           "regex": "^\\s*enable\\s*$",
           "platform": "common",
           "type": "recommended"
         },
```

DETECTING CONFIGURATION ANOMALY IN USER CONFIGURATION

BACKGROUND

This disclosure is generally related to configuration management. More specifically, this disclosure is related to a system and method for facilitating detection of configuration anomaly in user configuration.

BRIEF DESCRIPTION OF THE FIGURES

FIG. 3A shows an example syntax in a feature guide, according to one embodiment of the present disclosure.

FIG. 3B shows an example of processed data in a configuration template corresponding to the example syntax in FIG. 3A, according to one embodiment of the present disclosure.

In the figures, like reference numerals refer to the same figure elements.

DETAILED DESCRIPTION

Figure 1:
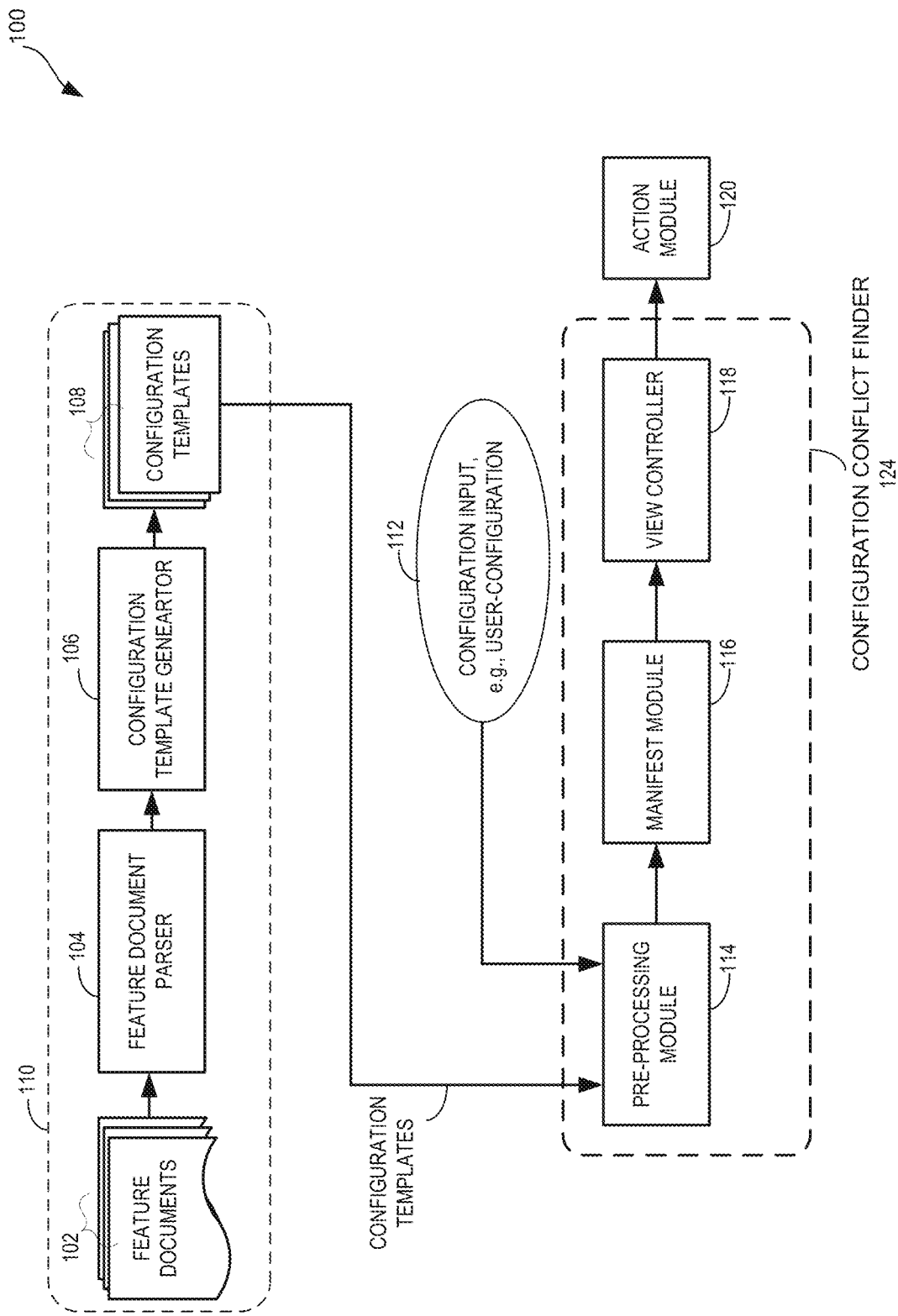
FIG. 1 illustrates an exemplary system architecture of a configuration anomaly detection system, according to one embodiment of the present disclosure.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown but is to be accorded the widest scope consistent with the principles and features disclosed herein.

In general, a network device, e.g., a network switch, in a computer network can include a plurality of features, and each feature can be defined by a set of configurations. With the increase in number of network devices in the computer network, the complexity and scale of configurations associated with the network devices has also increased manifold. Furthermore, the variations in the configurations across different product lines and releases has further added to the complexity of the configurations. Therefore, troubleshooting network device configuration issues in such computer networks can be difficult for network administrators. However, fixing these configuration issues is critical as they can result in network failures, e.g., functionality failures, service outages, and other network related issues. Therefore, identifying misconfigurations associated with a network switch can be critical to the proper operation of the network device and the computer network.

Several network configuration management systems have been developed to provide configuration management solutions that can overcome some of the errors in the network device configuration through syntax assistance. Specifically, existing configuration management solutions are based on validating configuration syntax and validating programmable logic within a codebase to detect configuration issues. However, there exist some challenges with these configuration management solutions in providing an error-free and complete configuration data before deploying the configuration in the network devices. Specifically, diagnosing configuration failures require reasoning across the network stack and associated operating environment which is a complex and computationally expensive process. In other words, when a network failure occurs due to configuration failures the users may not be able to find a root cause of the problem, and may result in engaging support engineers, field engineers, and/or developers for troubleshooting the network failure. In general, such configuration issues can be difficult for network users to prevent, detect, and troubleshoot at an early stage due to the complexity and scale of the configurations as well as variations across different product lines and releases. Therefore, significant amount of time can be spent in resolving the network failure which may lower the customer satisfaction.

The embodiments described herein solve the technical problem of detecting configuration anomalies (or configuration errors in network devices) and ensuring completeness of the configuration at an early stage to prevent network failures before deploying the configuration on a network device. Specifically, the embodiments described herein provide a novel system that considers two relevant factors: building a per feature configuration template from feature documentation; and building correlations between the feature configuration template and the running configuration associated with the network device. The system provides a configuration trouble shooting framework and a configuration conflict finder tool to automatically generate configuration templates based on information extracted from the feature documentation; and to learn configuration rules based on the generated configuration templates.

Misconfigurations in network devices are a critical problem as they can result in network failures, e.g., functionality failures, service outages, and other network issues. Often when a network failure occurs, the network users are unable to identify the root cause of the failure and may engage support or field engineers and in some instances may engage program developers to trace the root cause. Such a process can result in increased labor cost and hence can be expensive.

In addition, with the advent of remote management tools and cloud driven deployment, existing configuration validation techniques that involve a command line interface (CLI) can be ineffective in performing detection of configuration anomalies. For example, CLI commands can validate the syntax and applicability of a command based on the platform under consideration. However, a complete validation of the configuration is not performed while configuring CLI command. When the network issues due to misconfiguration are not addressed in a timely manner, they can result in an increased network downtime and user dissatisfaction. Existing network management solutions perform configuration syntax validations and apply programmable logic within a codebase to detect configuration issues. However, these configuration management solutions are still deficient in providing an error-free and complete configuration data before deploying the configuration in the network devices The embodiments described herein provide a technological solution to the above-mentioned issues by providing a novel configuration troubleshooting framework and tool, i.e., a configuration conflict finder (CCF). Specifically, a system and method are provided that can auto-generate a configuration template for each configuration feature from the available feature documentation. In other words, the system can extract relevant information from the existing documents and apply them effectively for validating one or more configuration features. The system can then learn configuration rules from the configuration templates and determine correlations between the configuration templates and the running configurations associated with a network device. Based on these correlations, the configuration rules, and other relationships that exists between different features within a configuration template, the system can detect different types of configurations anomalies, e.g., misconfiguration vulnerabilities, incomplete configuration, inter-dependent configuration, mutually exclusive configuration, non-recommended configurations, depreciated configurations, etc. Hence, the system can provide an effective tool for ensuring complete and error-free configuration before deploying the configuration on a network device, thereby reducing network downtime, and retaining customer satisfaction.

System Architecture

FIG. 1 illustrates an exemplary system architecture of a configuration anomaly detection system, according to one embodiment of the present disclosure. A configuration anomaly detection system can detect misconfiguration in a network device. Misconfigurations can be due to some configuration settings that may not be permitted by the network device constraints and/or may be conflicting due to co-existing configurations. Further, configuration problems can be due to misconfigurations vulnerabilities, incomplete configurations, inter-dependent configurations, mutually exclusive configurations, non-recommended configurations, depreciated configurations etc. Effectively identifying misconfigurations in network switch configurations (or other network device configurations) may allow network administrators to resolve the misconfigurations before these misconfigurations interfere with the operation of the network device and other associated devices.

In the example shown in FIG. 1, configuration anomaly detection system 100 can identify such misconfigurations by applying a configuration template generating module 110 and a configuration conflict finder 124. Configuration template generating module 110 can apply a feature document parser 104 to parse a set of feature documents 102. A feature document is a user documentation or feature guide that includes a description of a number of elements associated with network device features. For example, the feature document can include information about operations of a feature, configuration syntax, configuration guidelines, troubleshooting information, limitations, and interactions with other features in the system. In one embodiment, the system can apply feature document parser 104 to an enhanced representation of data in feature documents 102, e.g., features in the feature documents are presented in a certain format, so that they are parser friendly while retaining user readability Feature document parser 104 can parse these documents and generate a feature config template file, e.g., in JSON format. The template can include configuration syntax, semantics, limitations, and configuration rule or guidelines, e.g., mutually exclusive configuration, depreciated configurations, recommended values, etc.

In response to feature document parser 104 parsing feature documents 102, configuration template generator 106 can auto-generate feature configuration templates 108. When some of the configuration features are updated in feature documents 102, feature document parser 104 and configuration template generate 106 may provide information about which features in features documents 102 have depreciated or correspond to an older version of the feature configuration. Each feature configuration template can include configuration syntax, semantics, limitations, and configuration rules or guidelines, e.g., mutually exclusive configurations, depreciated configurations, recommended values, resource distribution values when resources are shared among features, etc. In one embodiment, feature document parser 104 and configuration template generator 106 can be combined into a single module. Feature document parser 104 can be integrated as part of a software image build process. Further, feature configuration templates 108 can represent a source of truth for validating user configuration for a given software image or build.

Configuration conflict finder (CCF) 124 can utilize feature configuration templates 108 to analyze configuration input 112, i.e., the user-configuration. In one embodiment, feature specific configuration templates 108 can be added and/or modified independent of CCF 124. In addition, feature configuration templates 108 can be added and/or modified by end users, e.g., developers, support engineers, customers, network administrators, etc.

CCF 124 can include a pre-processing module 114, a manifest module 116, and a view controller 118. Pre-processing module 114 may process user-configuration 112 and select a subset of feature configuration templates 108 based on information available in user-configuration 112. Pre-processing module 114 may provide the selected subset of feature configuration templates to manifest module 116 that can extract specific information of interest based on user-configuration 112 and can provide this information to view controller 118. View controller 118 can include a number of business rules, configuration recommendations, etc., to apply against the information received from manifest module 116 and generate a set of results, e.g., the results can include recommended configurations, information of potential misconfiguration, mutually exclusive configuration, etc. Action(s) 120 can provide the recommendations to the user for alleviating the detected configuration anomaly. Operation of CCF 124 is further described in relation to FIG. 2 below.

Figure 2:
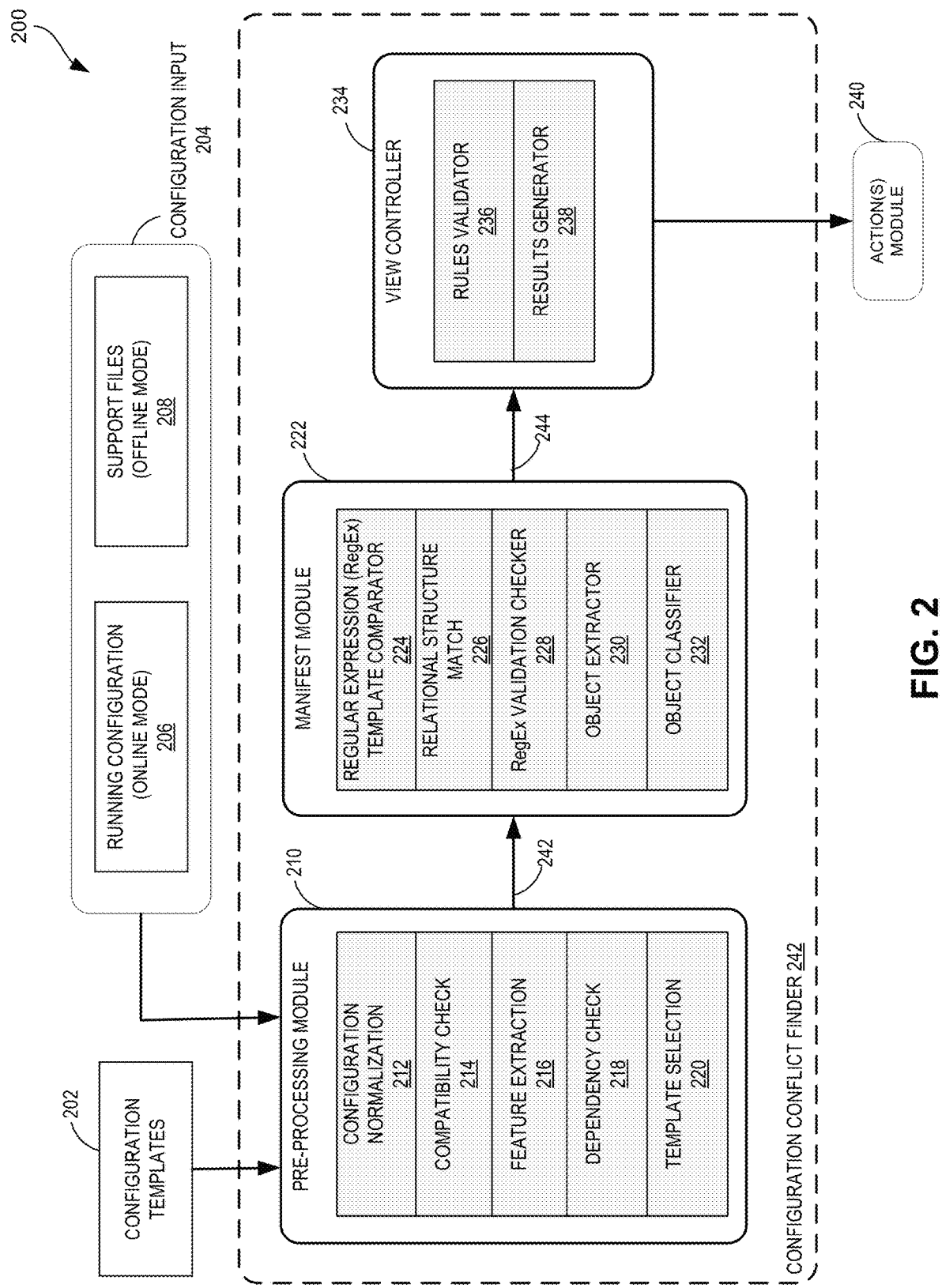
FIG. 2 illustrates an exemplary system architecture of a configuration conflict finder tool in a configuration anomaly detection system, according to one embodiment of the present disclosure.

FIG. 2 illustrates an exemplary system architecture of a configuration conflict finder tool in a configuration anomaly detection system, according to one embodiment of the present disclosure. In the example shown in FIG. 2, CCF 242 can include a pre-processing module 210, a manifest module 222, and a view controller 234. Pre-processing module 210 can receive configuration templates 202 and a configuration input 204. Configuration input 204 can be a user configuration, i.e., a running configuration or a set of support files. CCF 242 can operate in multiple modes, e.g., online mode or offline mode. In the online mode, pre-processing module 210 can receive a running configuration 206 associated with a network device, while in the offline mode support files 208 are received. CCF 242 can be operated within a network switch or as an external entity outside the network switch, e.g., a cloud device and an external centralized server that can provide configuration services, to analyze different network devices. CCF 242 can also operate independent of the software image associated with an operating environment of the network device.

In one embodiment, a user can initiate the operation of CCF 242, e.g., a user may specify a type of configuration to be validated and based on the user specification CCF 242 can process configuration templates 202 and configuration input 204. CCF 242 can be independent of the software and/or hardware version of the network device for which configuration validation is required.

Pre-processing module 210 can perform a number of operations which can include configuration normalization 212, compatibility check 214, feature extraction 216, dependency check 218, and template selection 220. In response to receiving configuration templates 202 and configuration input 204, pre-processing module 210 may perform configuration normalization 212 on user configuration in configuration input 204 to convert configuration data in the user configuration into a standard format. For example, if the desired file format is text format and the user configuration is in JavaScript Object Notation (JSON) format, then pre-processing module 210 may apply configuration normalization 212 to convert the user configuration JSON file format to text format and vice-verse. Converting the user configuration to a desired file format can facilitate the analysis of heterogeneous configuration data.

Pre-processing module 210 can then perform a compatibility check 214 to determine a hardware version of a network device based on the user configuration, i.e., configuration input 204. Compatibility check 214 may also be applied to determine a software version associated with the received user configuration. Based on the determined hardware and/or software version, compatibility check 214 may check and select configuration templates 202 that are matching or are compatible with the determined hardware and/or software version for the received the user configuration. Pre-processing module 210 may then apply feature extraction 216 to extract relevant features of interest in the selected configuration templates. For example, if Virtual Extensible LAN (VXLAN) feature is to be validated, then feature extraction 216 may extract VXLAN specific configuration features.

In one embodiment, pre-processing module 210 may perform a dependency check 218. For example, if VXLAN feature is to be validated, then feature extraction 216 may extract VXLAN specific configuration features and dependent virtual LAN (VLAN) specific configuration features. Further, if the VLAN has an interface, then dependency check 216 may identify a dependency between the VLAN feature and the VLAN interface feature, and hence feature extraction 216 may also extract VLAN interface specific configuration feature.

Based on compatibility check 214, feature extraction 216, and dependency check 218, pre-processing module 210 may perform template selection 220 to select a correct set of configuration templates 202 for validating the user configuration in configuration input 204. In other words, the selected configuration templates may include the required configuration features corresponding to the user configuration and may also include inter-dependent or mutually exclusive features. Pre-processing module 210 may combine the selected templates with the user configuration and send them to manifest module 222 as processed data 242 for further processing. Processed data 242 may include the features that are to be validated as well as inter-dependent or mutually exclusive features.

Manifest module 222 may apply a regular expression (RegEx) template comparator 224, relational structure validation 226, and RegEx validation checker 228 to compare the user configuration with the feature configuration templates in processed data 242 based on a set of regular expressions to determine relationships between features and the presence or absence of a feature. Different types of relationships can exist between the features, e.g., a mutually exclusive relationships, an inter-dependency relationship, etc. Manifest module 222 may determine whether the required features are present, if they are present, then module 222 may determine a value associated with a respective feature. For example, if manifest module 222 is checking for the presence of a VXLAN feature and if this feature is present, then manifest module 222 may determine a presence of a VLAN feature related the VXLAN feature. Further, in response to determining the presence the VLAN feature, manifest module 222 can determine a number associated with the VLAN, the presence of an interface for the VLAN, and an associated port number. In other words, if the interface is present, then manifest module 222 may determine a port number for the interface. Further, manifest module 222 may determine whether the specific port is enabled or disabled.

The operations performed by manifest module 222 may represent a structural validation of user configuration against the selected configuration templates present in processed data 242. If some configuration features, e.g., a port number, are missing in the user configuration, then manifest module 222 may add these configurations features as errors or problems into a configuration object 244 which can be sent to view controller 234. In other words, manifest module 222 may utilize the feature templates in processed data 242 to match against the user configuration and extract relevant information. Manifest module 222 may apply object extractor 230 and object classifier 232 to classify this relevant information into different groups based on the user configuration and may create configuration object 244 which can serve as a model or data part of a Model-View-Controller (MVC) pattern. Configuration object 244 may include the user configuration and a partial result of the analysis in manifest module 222 which can indicate the presence or absence of some relevant configuration features in the user configuration.

View controller 234 can include a rules validator 236 and a results generator 238. Rules validator 236 can apply a set of rules across the features in configuration object 244. The set of rules associated with rules validator 236 can include and is not limited to mutually exclusive configuration rule, depreciated configuration rule, recommended value rule, resource distribution value rule, inter-dependent configuration rule, etc. For example, if configuration object 244 includes feature A, feature B, and feature C, rules validator 236 may apply the set of rules to validate the features A-C. For example, if features A-C are inter-dependent on each other, then these features are to be validated based on an inter-dependency rule. In another example, features A-C can be configured based on the system hardware and/or software limitations with regards to resource usage for different features, e.g., number of entries allowed in ternary content addressable memory (TCAM) for an access control list (ACL). If feature A is configured to use a specific amount of resource, this may impact the amount of resource feature B and C can use when all the three features are activated together. Therefore, rules validator 236 may validate such resource distribution values among the different features configured for a network device, thereby ensuring that the system hardware and/or software resource limitations are satisfied. In another example, if feature B and feature C are mutually exclusive features, then both the features cannot be configured to operate together with same settings, and they can be validated using a mutually exclusive rule.

Based on the validation of the user configuration features, rules validator 236 may generate an overview of system level detections of a configuration problem and create a result object to include the configuration problems. The configuration problems or anomalies in the configuration can include and are not limited to vulnerabilities due to misconfiguration, incomplete configuration, inter-dependent misconfiguration, mutually exclusive misconfiguration, and non-recommended configuration. In one embodiment, the result object can include both a rule-based validation result and a syntax-based validation result. Results generator 238 may process the result object to generate results which can include a report on a list of recommended configurations and information about the detected anomalies. Action(s) module 240 may provide these recommendations generated by results generator 238 to a user on a graphical user interface (GUI). The user may then decide to select one or more of the recommendations and apply the recommendations to the user configuration.

Some of the advantages of applying configuration anomaly detection system 200 is that system 200 can exploit the data and/or knowledge source available in the feature documents and can create a source of truth for validating user configuration completeness, inter-dependency, mutual exclusion, etc. Further, since CCF 242 is not required to be coupled with a software image or codebase, CCF 242 can be operated from within a network switch or offline outside the network switch. In addition, CCF 242 may include a provision to add new syntax and validation rules in configuration templates 202 as per the customer requirement on the fly, thereby providing the support engineers, and/or network administrators with a robust tool for detecting anomalies in the user configuration. Configuration anomaly detection system 200 can facilitate early detection of misconfigurations to prevent the occurrence of network issues, thereby reducing network downtime and improving customer satisfaction. Further, integrating configuration anomaly detection system 200 with cloud analytics solutions can facilitate detection of common anomalies across various customer configurations, thereby improving the configuration management system. In addition to applying configuration anomaly detection system 200 for detecting anomalies in network switch configurations, system 200 can also be applied to other domains, e.g., a server, a storage device, etc.

FIG. 3A shows an example syntax in a feature guide, according to one embodiment of the present disclosure. The example shown in FIG. 3A, represents a syntax 302 in a feature guide or a feature document for a port access feature. Specifically, FIG. 3A provides an example for a "port-access device profile" feature and depicts a minimum required configuration for an expected feature behavior. Further, FIG. 3A provides a structural overview of the feature configuration and defines the variables associated with the configuration of the corresponding feature specified in the feature document or functionality guide, e.g., the variables can be represented within single brackets < > to get their corresponding values. In another example, variables within a single bracket can represent a source and variables within a double bracket, i.e., « », can represent a reference to the source. Furthermore, the feature document can include information about operations of a feature, configuration syntax, configuration guidelines, troubleshooting information, limitations, and interactions with other features. The system may apply a feature document parser, e.g., 104 in FIG. 1, to process the details shown in FIG. 3A and may convert them into a structured regular expression, e.g., in JSON format, which is shown in FIG. 3B. For example, the parser can extract a set of rules included in the above-mentioned information in the feature document and can convert the set of rules to a structured regular expression. In other words, the parser can represent the set of rules in a structured regular expression format. For example, the structured regular expression can include a pattern for matching configuration syntax information associated with operations of a feature, limitations, interactions with other features, etc.

FIG. 3B shows an example of processed data in a configuration template corresponding to the example syntax in FIG. 3A, according to one embodiment of the present disclosure. For example, the configuration anomaly detection system shown in FIG. 1, can apply configuration template generating module 110 to automatically convert syntax 302 to a feature configuration template 304 shown in FIG. 3B. Further, configuration template generating module 110 can generate a regular expression 306 based on syntax 302 and can include the regular expression within feature configuration template 304 that can be easily understood by the CCF tool. Regular expression 306 can represent a source of truth for validating various user configurations for a specific feature, e.g., "port-access device profile" feature.

The CCF tool has a diverse set of use cases, for example the tool can be applied to a diverse set of features associated with different versions of a network device, e.g., network switch, which are not limited to protocol independent multicast (PIM), Internet Group Management Protocol (IGMP), link aggregation (LAG) or link aggregation control protocol (LACP), open shortest path first (OSPF), Border Gateway Protocol (BGP), network authentication protocol 802.1x, Media Access Control (MAC) authentication, device profile, dynamic host configuration protocol (DHCP) relay, virtual switching framework (VSF), etc. The CCF tool can be deployed both online (within a network device) or offline (on a virtual machine). In the following, different use cases of the CCF tool are described in relation to FIGS. 4A-4C.

Figure 4A:
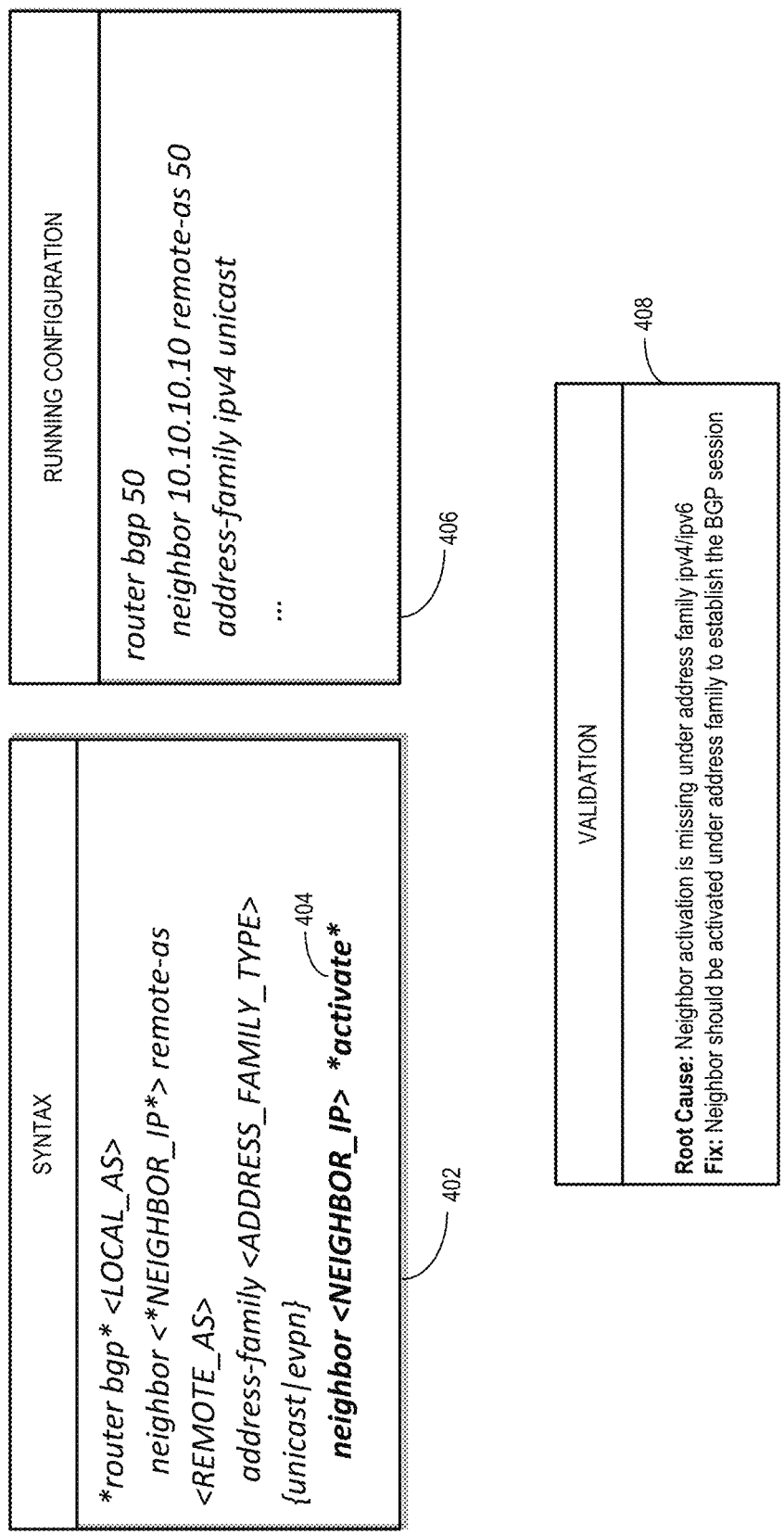
FIG. 4A illustrates an exemplary application of the configuration conflict finder tool for detecting missing configuration, according to one embodiment of the present disclosure.

FIG. 4A illustrates an exemplary application of the configuration conflict finder tool for detecting missing configuration, according to one embodiment of the present disclosure. The example shown in FIG. 4A illustrates an application of the CCF tool to troubleshoot an issue related to establishing a BGP session. Specifically, a network device had failed to establish a BGP session. A timely detection of the root cause of this issue can be critical for reducing network downtime and retaining customer's satisfaction. The CCF tool may receive a user configuration (or a running configuration 406) associated with the network device and a set of feature configuration templates.

The CCF tool may select a feature template that is relevant to the user configuration. CCF tool may then perform a number of operations described in FIG. 2 to determine that running configuration 406 has a trivial error of a missing neighbor activation. Syntax 402 associated with the selected feature template indicates that the presence of a neighbor activate command 404 is required to establish a connection with a neighboring network device. This missing configuration in running configuration 406 had resulted in a failure to establish a BGP session. The CCF tool may apply structural validation based on a set of rules to generate a validation result 408 that can include a description of a root cause of the failure and a recommendation about how to alleviate or fix this failure.

The missing configuration issue addressed in FIG. 4A can be an implicit error in configuration which resulted in a failure to establish a BGP session. For the BGP session to establish a connection with a BGP peer, neighbor IP 404 should be activated under address family internet protocol versions ipv4/ipv6. Although such a setting is mandatory for the BGP feature, this setting may not be enforced by command line interface (CLI) or other feature functionalities. Further, in addition to the limited provisions for performing a cross-check of the configurations, a support engineer, or a network administrator responsible for deploying the user configuration may have limited knowledge of the BGP feature which can result in incorrect configuration. This is because BGP configuration can be one of the complex configurations for network administrators and to have complete knowledge about the BGP feature can practically difficult. These limitations can result in an error in the configuration and the network administrator may wrongly attribute this connection failure to a BGP feature instead of a missing configuration to activate a neighbor 404.

Some of the network issues that involve complex configurations can take advantage of the CCF tool to perform an early detection of the network issues, thereby gaining customer confidence. Specifically, the CCF tool can enable the network administrator to have a complete knowledge of different configuration settings and values associated with different features in the feature documents. In other words, the CCF tool facilitates the customers, test engineer, support engineer, and/or development engineers to enhance the robustness of their configuration anomaly detection system against configuration errors. Therefore, the CCF tool can provide a configuration troubleshooting solution that can detect configuration anomalies in a network device, e.g., a network switch, by leveraging a set of feature configuration templates that are auto generated from a feature functionality documentation.

Figure 4B:
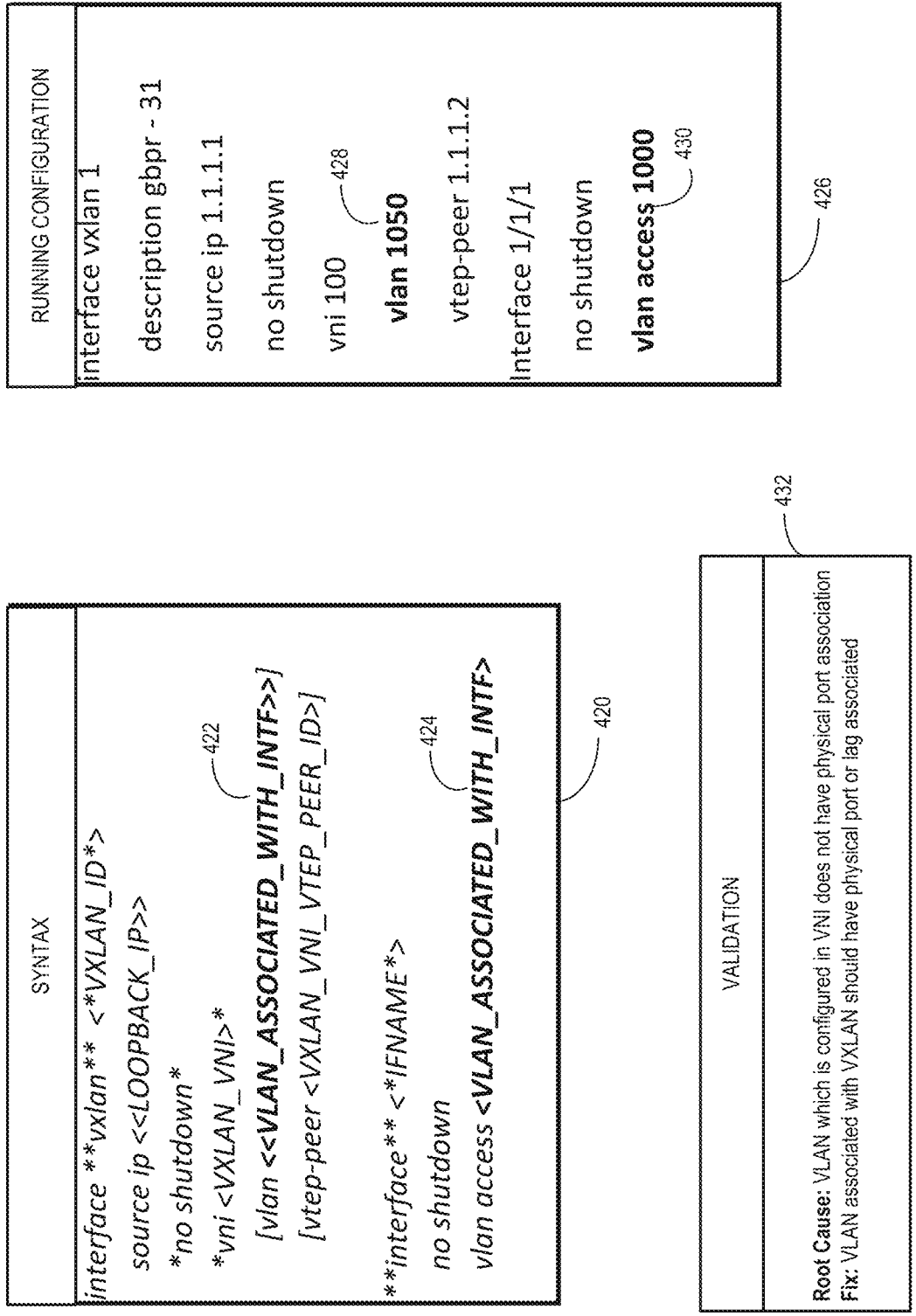
FIG. 4B illustrates an exemplary application of the configuration conflict finder tool for detecting configuration inter-dependency issues, according to one embodiment of the present disclosure.

FIG. 4B illustrates an exemplary application of the configuration conflict finder tool for detecting configuration inter-dependency issues, according to one embodiment of the present disclosure. The example shown in FIG. 4B illustrates an application of the CCF tool to troubleshoot an issue related to traffic loss in a VXLAN setup. The CCF tool may select a feature template that is relevant to the received user configuration (or running configuration 426). CCF tool may then perform a number of operations described in FIG. 2 to determine that running configuration 426 does not have a correct physical port association, e.g., 428 and 430 are different, but according to syntax 420 they should be associated with same number. Syntax 420 associated with the selected feature template indicates that the VXLAN setup depends on or refers to a VLAN interface 422. Further VLAN setup is supposed to include a port associated with VLAN that is required for sending VXLAN traffic.

The CCF tool can apply a set of rules to determine the relationship/dependency among the different features in the VXLAN setup. In one embodiment, the set of rules can be automatically learnt from the syntax. This is because each syntax can convey a special meaning about the configuration of the feature. Further, the feature document parser can understand the meaning of the configuration feature embedded in the syntax and can convert them into a detailed structure which the system can apply for the purpose of validation of the configuration feature. Based on the syntax, the CCF tool may perform a chain validation, i.e., the CCF tool may determine that a problem in feature 430 is affecting the VXLAN feature. In other words, the root cause of VXLAN traffic loss is due to some other feature lower in the dependency hierarchy of the configuration that was misconfigured or missing. In the example shown in FIG. 4B, the problem may not be directly due to VXLAN configuration, but the problem can be due to the port used by the VLAN configured in the VXLAN feature. Therefore, the CCF tool can detect a root cause of a failure based on inter-dependency between features in a configuration.

This missing configuration dependency in running configuration 426 was the cause of VXLAN traffic loss. The CCF tool may apply structural reference validation to generate a validation result 432 which can include a description of a root cause of the failure and a recommendation about how to alleviate or fix this failure.

Figure 4C:
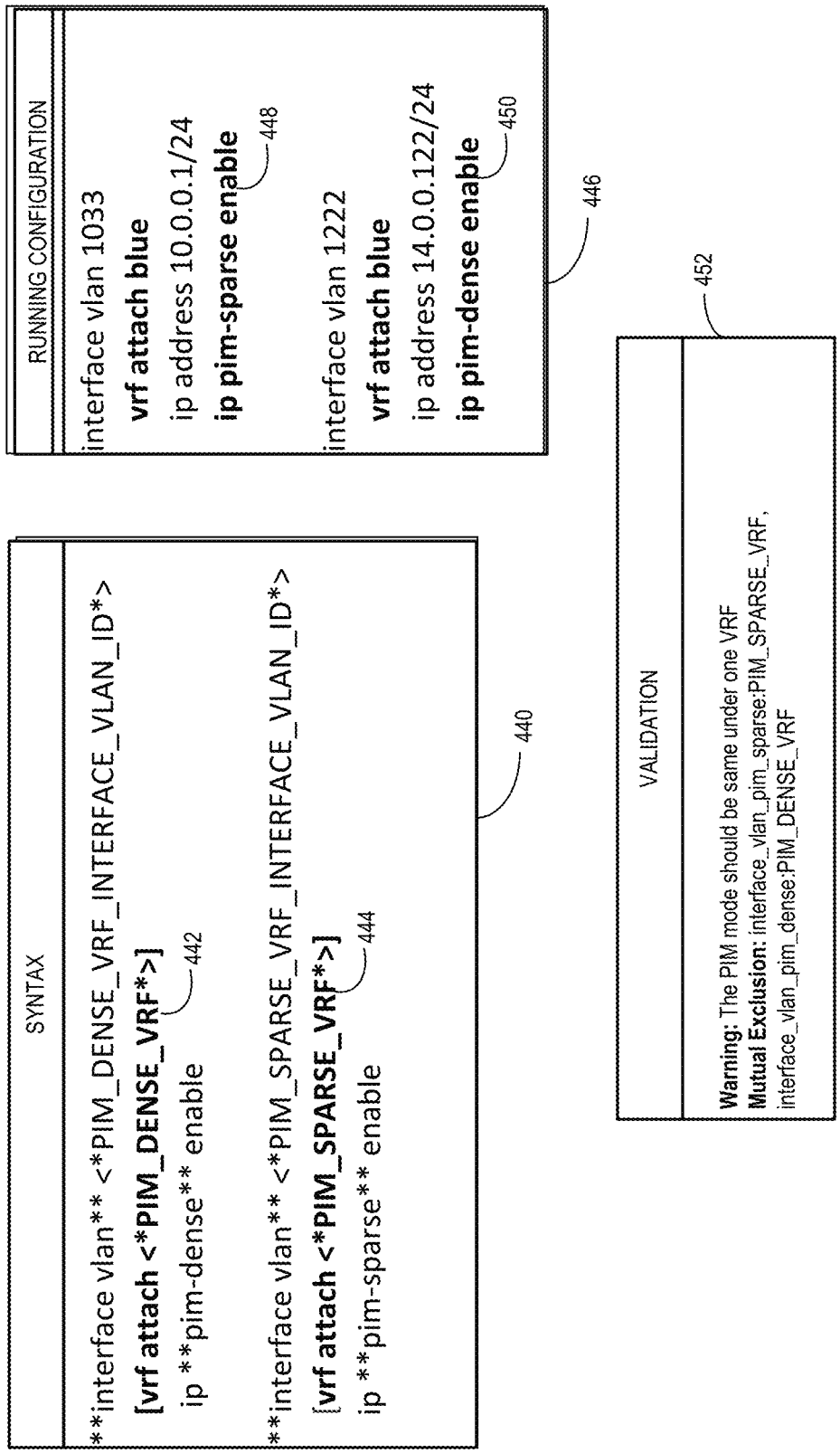
FIG. 4C illustrates an exemplary application of the configuration conflict finder tool for detecting a mutual exclusion issue, according to one embodiment of the present disclosure.

FIG. 4C illustrates an exemplary application of the configuration conflict finder tool for detecting a mutual exclusion issue, according to one embodiment of the present disclosure. In the example shown in FIG. 4C, the CCF tool can detect a PIM mode inconsistency by applying a mutual exclusion validation rule. For example, in syntax 440, features 442 and 444 may be mutually exclusive, meaning that the setting of features 442 and 444 may not be the same. For such mutual exclusion, the feature guide may specify that these two features may not be enabled together; this specification can be detected and updated in the feature configuration template. For example, configuring two mutually exclusive features together may result in an undesired behavior. For this reason, the system may list features which are mutually exclusive to a given feature. The feature document parser, e.g., 104 in FIG. 1, can capture this information and the CCF tool can use this information to identify whether mutually exclusive features are configured together.

The CCF tool may identify, based on running configuration 446, a feature configuration template with syntax 440. The CCF tool may then determine based on a set of mutual exclusion rules that the PIM mode should be the same for one virtual routing and forwarding (VRF). The CCF tool may generate a validation result 452 with a warning and that features 448 and 450 in running configuration 446 are supposed to be mutually exclusive and cannot be enabled together.

In another use case example, the CCF tool can detect IGMP version mismatch in a VLAN configuration based on a "match" validation. For example, the CCF tool may generate a validation result which can provide a warning that the IGMP version and the IGMP snooping version should match on the same VLAN, otherwise a lower version would be selected as the operating version. The network administrator may not be aware of such warnings, i.e., when a mismatch in version occurs a lower version may be selected, hence the CCF tool can enable the network administrator to perform a robust and effective detection of configuration anomalies.

In a further use case example, the CCF tool can detect configuration inconsistency between peers based on a "peer match" validation rule. For correct peer synchronization and detection, system MAC address should be consistent across the peers. If the system MAC is not consistent, then the peer may not be synchronized. Further, multi-chassis link aggregation group (MCLAG) configurations should be consistent across the peers for better traffic performance (without traffic loss). The CCF tool can detect these configuration inconsistencies between peers based on a "peer match" validation rule. In other words, the CCF tool may apply the "peer match" validation rule, based on the feature configuration templates, against the running configurations associated with the peers to identify specific configuration parameters that are required for correct operation of the peers. The CCF tool may detect such misconfiguration anomalies in the peers and provide recommendation to alleviate the configuration anomaly. Further to this use case example, the CCF tool may also apply a "subset" validation rule to misconfigurations in the MCLAG's VLAN configuration. For example, when two configurations are related in a way that one is a subset of another, this "subset" validation rule can facilitate in validating whether on configuration is a subset of other configurations. This can be a useful in features like MCLAG, device profile, in which the "subset" validation rule can ensure that subset relationship between two configurations is satisfied.

Figure 5:
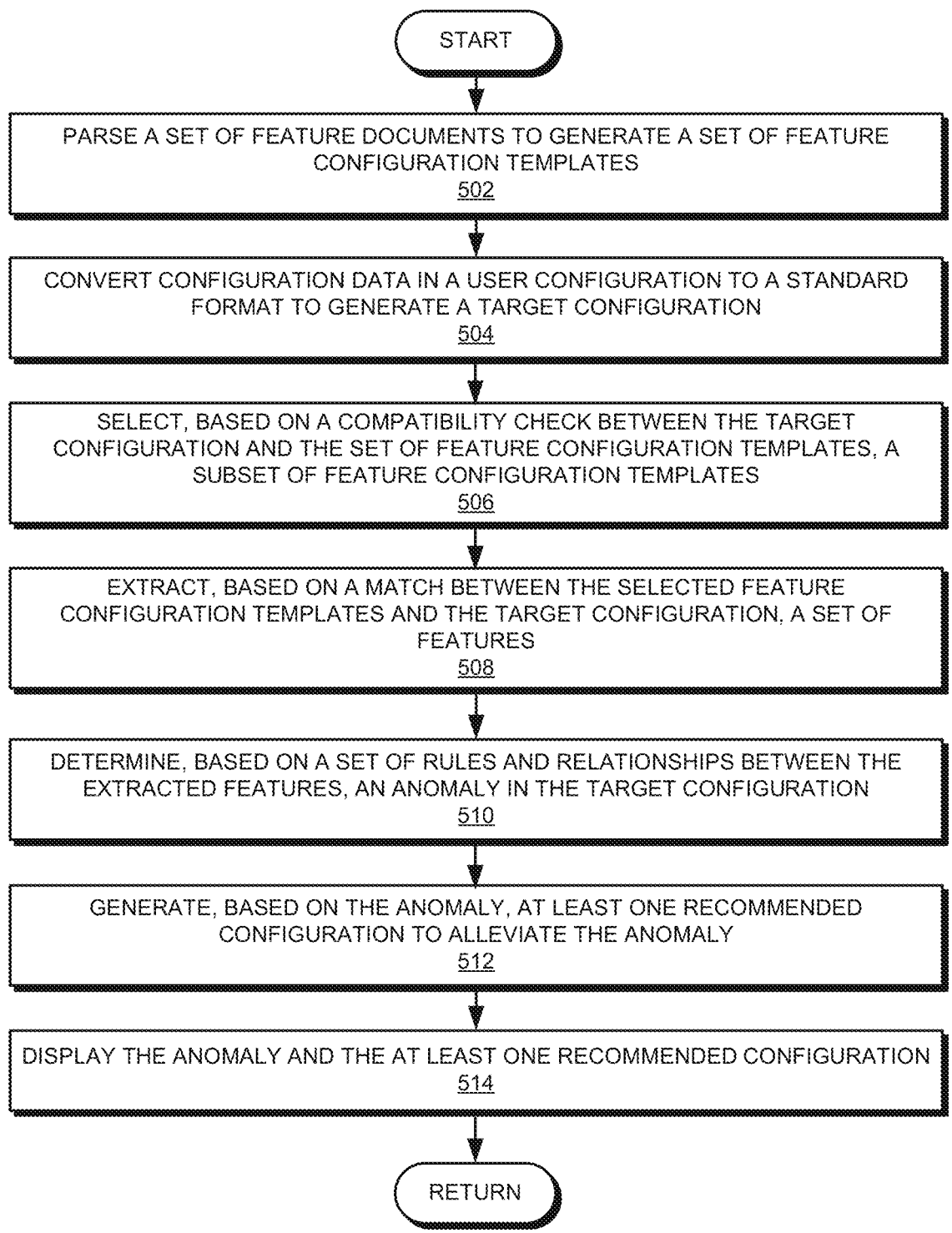
FIG. 5 presents a flowchart illustrating a process for facilitating detection of configuration anomaly in user configuration, according to one embodiment of the present disclosure.

FIG. 5 presents a flowchart illustrating a process for facilitating detection of configuration anomaly in user configuration, according to one embodiment of the present disclosure. During operation, a system, e.g., a configuration anomaly detection system, may parse a set of feature documents to generate a set of feature configuration templates (operation 502). The feature documents or user documentations or feature guide can include information about configuration of a network device, e.g., a network switch, and this information can be represented in a structured form in the user documentation. The system may include a parser to analyze the structured feature document and generate a feature configuration template file including several relevant syntax and rules for validating the user configuration or the running configuration.

The system can convert configuration data in the user configuration or running configuration (which can be received as a configuration input) to a standard format to generate a target configuration (operation 504). Such a conversion of the configuration data in the user configuration to a standard format may facilitate the analysis of heterogeneous configuration data. For example, if the format of the user configuration is in text format and the desirable format for performing analysis on the user configuration is JSON format, then the system may convert the text format of the user configuration to JSON format and vice-versa.

The system can then select, based on a compatibility check between the target configuration and the set of feature configuration templates, a subset of feature configuration templates (operation 506). In other words, the system may select a relevant set of feature configuration templates based on the information, e.g., software version of the configuration, hardware version of the network device, etc., available in the target configuration. The system can extract, based on a match between the selected feature configuration templates and the target configuration, a set of features from the selected feature configuration templates (operation 508).

The system may determine, based on a set of rules associated with the extracted features, an anomaly in the target configuration (operation 510). The relationships between the extracted features can include a mutually exclusive relationship, inter-dependent relationship, peer relationship, etc. In one embodiment, the system can determine the set of rules from the selected feature configuration templates. The set of rules can include and are not limited to mutually exclusive configuration, depreciated configuration, recommended values, resource distribution values, and inter-dependent configuration. The detected anomaly in the target configuration can include misconfiguration vulnerabilities, incomplete configuration, inter-dependent misconfiguration, mutually exclusive misconfiguration, non-recommended configuration, etc.

In response to determining the anomaly, the system can generate at least one recommended configuration to alleviate the anomaly (operation 512). For example, the system may determine a root cause of a failure or issue in the target configuration and provide a solution to alleviate the anomaly. The system can then display the anomaly and the recommendation on a GUI (operation 514) and the operation returns.

Exemplary Computer System and Apparatus

Figure 6:
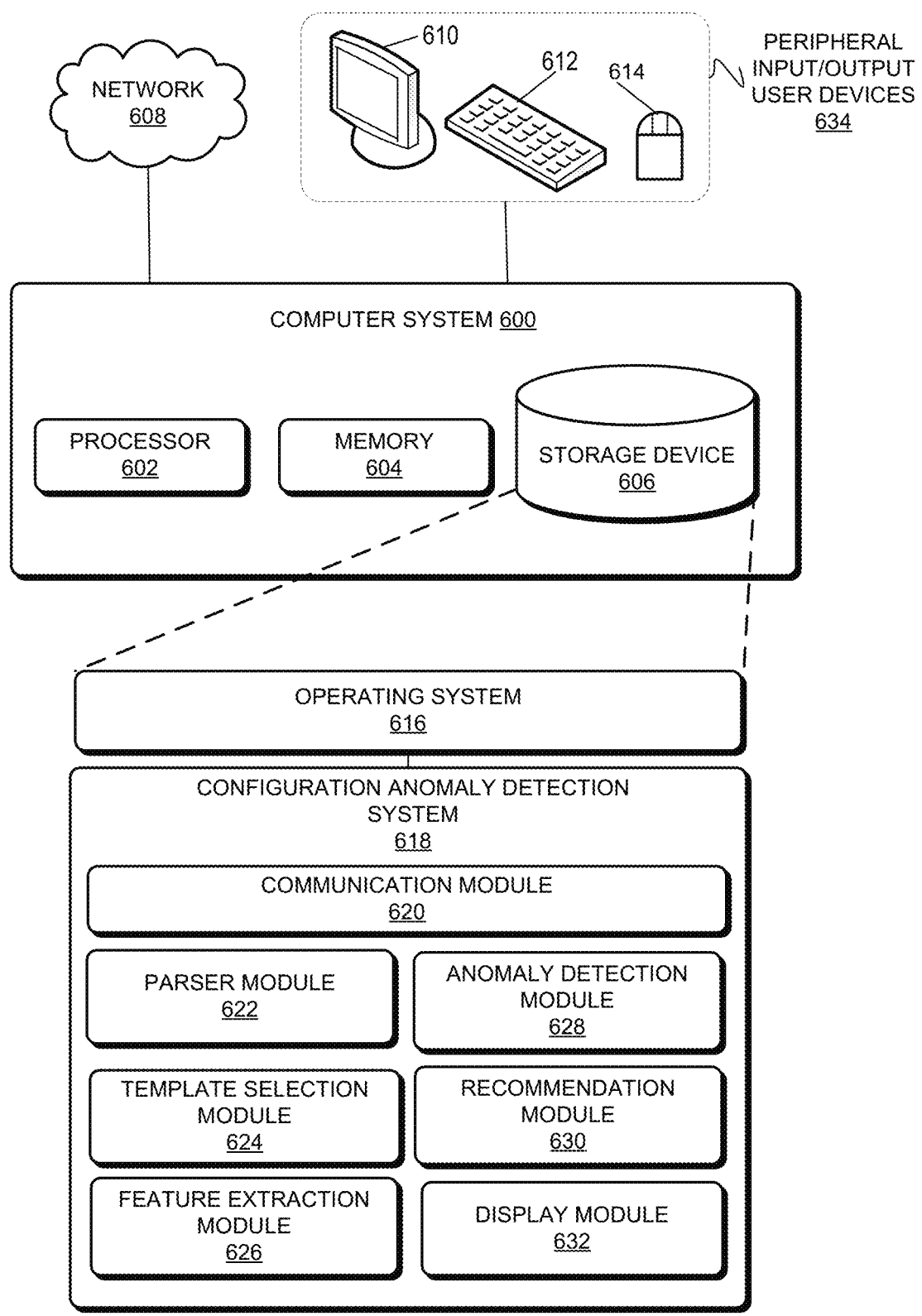
FIG. 6 illustrates an exemplary computer system for facilitating detection of configuration anomaly in user configuration, according to one embodiment of the present disclosure.

FIG. 6 illustrates an exemplary computer system for facilitating detection of configuration anomaly in user configuration, according to one embodiment of the present disclosure. In this example, computer system 600 can include a processor 602, a memory 604, and a storage device 606. Computer system 600 can be coupled to peripheral input/output (I/O) user devices 634, e.g., a display device 610, a keyboard 612, and a pointing device 614, and can also be coupled via one or more network interfaces to network 608. Storage device 606 can store instructions for an operating system 616 and a configuration anomaly detection system 618.

In one embodiment, configuration anomaly detection system 618 can include instructions, which when executed by processor 602 can cause computer system 600 to perform methods and/or processes described in this disclosure. Configuration anomaly detection system 618 can include a communication module 620 to receive feature documents and user configuration, e.g., a running configuration that is to be validated. Configuration anomaly detection system 618 can further include instructions implementing a parser module 622 for parsing the feature documents to generate a set of feature configuration templates.

Configuration anomaly detection system 618 can include a template selection module 624, which can select a set of relevant feature configuration templates based on information available in the user configuration. Configuration anomaly detection system 618 can also include a feature extraction module 626 for extracting a set of features from the set of relevant feature configuration templates based on a match between the relevant feature configuration templates and the user configuration. Configuration anomaly detection system 618 can further include an anomaly detection module 628 to determine an anomaly in the user configuration based on a set of rules and relationships between the extracted features.

Configuration anomaly detection system 618 can further include instructions implementing a recommendation module 630 which can generate based on the determined anomaly and the set of rules at least one recommendation to alleviate the anomaly. Configuration anomaly detection system 618 can further include a display module 632 to generate a visual representation of the anomaly and the at least one recommendation for alleviating the anomaly. Communication module 620 can further include instructions to send the output of display module 632 to display device 610 for displaying using a GUI.

One embodiment can provide a method and a system for detecting configuration anomalies in a network device. During operation, the system can convert a set of rules associated with configuration syntax information for a feature in a respective feature document to at least a structured regular expression. The structured regular expression represents the set of rules in a regular expression format and the configuration syntax information includes one or more of operations associated with the feature, relationships with other features, and limitations. The system can then generate a set of configuration templates with a respective configuration template including the structured regular expression corresponding to the feature document. The system can select, based on a target configuration associated with the network device, a subset of the configuration templates. The system can then extract, based on a match between the selected configuration templates and the target configuration, a set of features. The system can determine, based on the selected configuration templates, one or more rules associated with the extracted features. The system can then determine, based on the one or more rules, an anomaly in the target configuration. Further, the system can generate, based on the anomaly, at least one recommended configuration to alleviate the anomaly, and can then display the anomaly and the at least one recommended configuration.

In a variation on this embodiment, anomaly can include one or more of: misconfiguration vulnerabilities; an inter-dependent misconfiguration; incomplete configuration; mutually exclusive misconfiguration; and non-recommended configuration.

In a variation on this embodiment, the system can determine, based on the selected configuration templates, the one or more rules associated with the extracted features by identifying the structured regular expression in a respective configuration template; and determining, based on the structured regular expression and the target configuration, a relationship between one or more extracted features; and a presence of a feature. The relationships between the extracted features include one or more of: mutually exclusive relationship; and inter-dependency relationship.

In a variation on this embodiment, the system can generate the set of configuration templates by converting configuration data in a user configuration to at least the structured regular expression in a standard format which represents a configuration template. The configuration template can represent a reference for validating the target configuration. The configuration template can include one or more of: configuration syntax, semantics, and configuration rules.

In a variation on this embodiment, the system can select, based on the target configuration associated with the network device, the subset of configuration templates by: identifying a software version in the target configuration; identifying a hardware version in the target configuration; performing, based on the identified software and hardware version, a compatibility check with the set of configuration templates; and in response to determining that the identified software version and the hardware version in the target configuration matches with a software version and hardware version specified in the subset of configuration template, selecting, based on the compatibility check, the subset of configuration templates.

In a variation on this embodiment, a respective configuration template can include one or more of: configuration syntax; configuration semantics; the set of rules; and configuration limitations.

In a variation on this embodiment, the set of rules can include one or more of: inter-dependent configuration rule; mutually exclusive configuration rule; depreciated configuration rule; recommended values rule; and resource distribution values rule.

In a variation on this embodiment, the system can determine, based on the one or more rules, the anomaly in the target configuration by determining a root cause of an issue in the network device which can involve in response to determining that a feature in the target configuration does not satisfy at least one rule associated with a corresponding extracted feature, determining that the feature is misconfigured; and in response to determining that the target configuration does not include the feature corresponding to the extracted feature, determining that the feature is absent.

In a further variation, the system can determine offline, based on the one or more rules, before deploying the target configuration in the network device, the anomaly in the target configuration.

In a further variation, the system can determine online within the network device, based on the one or more rules, the anomaly in the target configuration.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method for detecting configuration anomalies in a network device, the method comprising:
converting a set of rules associated with configuration syntax information for a feature in a respective feature document to at least a structured regular expression, wherein the structured regular expression represents the set of rules in a regular expression format, and wherein the configuration syntax information includes one or more of operations associated with the feature, relationships with other features, and limitations;
generating a set of configuration templates with a respective configuration template including the structured regular expression corresponding to the feature document;
selecting, based on a target configuration associated with the network device, a subset of the configuration templates;
extracting, based on a match between the selected configuration templates and the target configuration, a set of features;
determining, based on the selected configuration templates, one or more rules associated with the extracted features;
determining, based on the one or more rules, an anomaly in the target configuration;
generating, based on the anomaly, at least one recommended configuration to alleviate the anomaly; and displaying the anomaly and the at least one recommended configuration.

2. The method of claim 1, wherein the anomaly includes one or more of:
   misconfiguration vulnerabilities;
   an inter-dependent misconfiguration;
   incomplete configuration;
   mutually exclusive misconfiguration; and
   non-recommended configuration.

3. The method of claim 1, wherein determining, based on the selected configuration templates, the one or more rules associated with the extracted features further comprises:
   identifying the structured regular expression in a respective configuration template; and
   determining, based on the structured regular expression and the target configuration,
      a relationship between one or more extracted features; and
      presence of a feature;
   wherein the relationships between the extracted features include one or more of: mutually exclusive relationship; and inter-dependency relationship.

4. The method of claim 1, wherein generating the set of configuration templates further comprises:
   converting configuration data in a user configuration to at least the structured regular expression in a standard format which represents a configuration template, wherein the configuration template represents a reference for validating the target configuration, and wherein the configuration template includes one or more of: configuration syntax, semantics, and configuration rules.

5. The method of claim 1, wherein selecting, based on the target configuration associated with the network device, the subset of configuration templates, comprises:
   identifying a software version in the target configuration;
   identifying a hardware version in the target configuration;
   performing, based on the identified software and hardware version, a compatibility check with the set of configuration templates;
   in response to determining that the identified software version and the hardware version in the target configuration matches with a software version and hardware version specified in the subset of configuration template, selecting the subset of configuration templates.

6. The method of claim 1, wherein the configuration template includes:
   configuration syntax;
   configuration semantics;
   the set of rules; and
   configuration limitations.

7. The method of claim 1, wherein the set of rules include:
   inter-dependent configuration rule;
   mutually exclusive configuration rule;
   depreciated configuration rule;
   recommended values rule; and
   resource distribution values rule.

8. The method of claim 1, wherein determining, based on the one or more rules, an anomaly in the target configuration further comprises, determining a root cause of an issue in the network device by:
   in response to determining that a feature in the target configuration does not satisfy at least one rule associated with a corresponding extracted feature, determining that the feature is misconfigured; and
   in response to determining that the target configuration does not include the feature corresponding to the extracted feature, determining that the feature is absent.

9. The method of claim 1, wherein the determining, based on the one or more rules, the anomaly in the target configuration is performed offline before deploying the target configuration in the network device.

10. The method of claim 1, wherein the determining, based on the one or more rules, the anomaly in the target configuration is performed online within the network device.

11. A computer system, comprising:
    a processor; and
    a storage device coupled to the processor and storing instructions, which when executed by the processor cause the processor to perform a method for detecting configuration anomalies in a network device, the method comprising:
       converting a set of rules associated with configuration syntax information for a feature in a respective feature document to at least a structured regular expression, wherein the structured regular expression represents the set of rules in a regular expression format, and wherein the configuration syntax information includes one or more of operations associated with the feature, relationships with other features, and limitations;
       generating a set of configuration templates with a respective configuration template including the structured regular expression corresponding to the feature document;
       selecting, based on a target configuration associated with the network device, a subset of the configuration templates;
       extracting, based on a match between the selected configuration templates and the target configuration, a set of features;
       determining, based on the selected configuration templates, one or more rules associated with the extracted features;
       determining, based on the one or more rules, an anomaly in the target configuration;
       generating, based on the anomaly, at least one recommended configuration to alleviate the anomaly; and
       displaying the anomaly and the at least one recommended configuration.

12. The computer system of claim 11, wherein the anomaly includes one or more of:
    misconfiguration vulnerabilities;
    an inter-dependent misconfiguration;
    incomplete configuration;
    mutually exclusive misconfiguration; and
    non-recommended configuration.

13. The computer system of claim 11, wherein determining, based on the selected configuration templates, the one or more rules associated with the extracted features further comprises:
    identifying the structured regular expression in a respective configuration template; and
    determining, based on the structured regular expression and the target configuration,
       a relationship between one or more extracted features; and
       presence of a feature;
    wherein the relationships between the extracted features include one or more of: mutually exclusive relationship; and inter-dependency relationship.

14. The computer system of claim 11, wherein generating the set of configuration templates further comprises:
   converting configuration data in a user configuration to at least the structured regular expression in a standard format which represents a configuration template, wherein the configuration template represents a reference for validating the target configuration, and wherein the configuration template includes one or more of: configuration syntax, semantics, and configuration rules.

15. The computer system of claim 11, wherein selecting, based on the target configuration associated with the network device, the subset of configuration templates, comprises:
   identifying a software version in the target configuration;
   identifying a hardware version in the target configuration;
   performing, based on the identified software and hardware version, a compatibility check with the set of configuration templates; and
   in response to determining that the identified software version and the hardware version in the target configuration matches with a software version and hardware version specified in the subset of configuration template, selecting the subset of configuration templates.

16. The computer system of claim 11, wherein the configuration template includes:
   configuration syntax;
   configuration semantics;
   the set of rules; and
   configuration limitations.

17. The computer system of claim 11, wherein the set of rules includes:
   inter-dependent configuration rule;
   mutually exclusive configuration rule
   depreciated configuration rule;
   recommended values rule; and
   resource distribution values rule.

18. The computer system of claim 11, wherein determining, based on one or more rules associated with the extracted features, an anomaly in the target configuration further comprises, determining a root cause of an issue in the network device by:
   in response to determining that a feature in the target configuration does not satisfy at least one rule associated with corresponding extracted feature, determining that the feature is misconfigured; and
   in response to determining that the target configuration does not include the feature corresponding to the extracted feature, determining that the feature is absent.

19. The computer system of claim 11, wherein the determining, based on the one or more rules, the anomaly in the target configuration is performed offline before deploying the target configuration in the network device.

20. The computer system of claim 11, wherein the determining, based on the one or more rules, the anomaly in the target configuration is performed online within the network device.

* * * * *